J. C. PIECHOCKI AND E. K. BOINSKI.
WRENCH.
APPLICATION FILED JUNE 11, 1921.
1,437,774.
Patented Dec. 5, 1922.
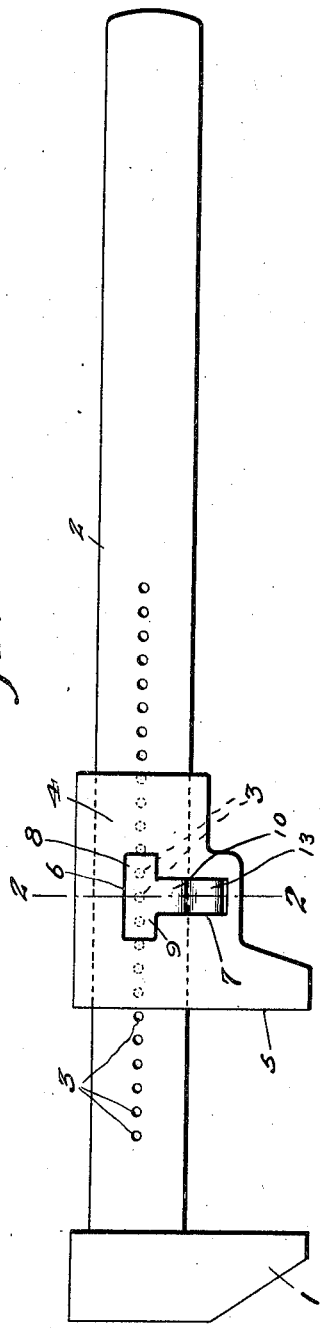
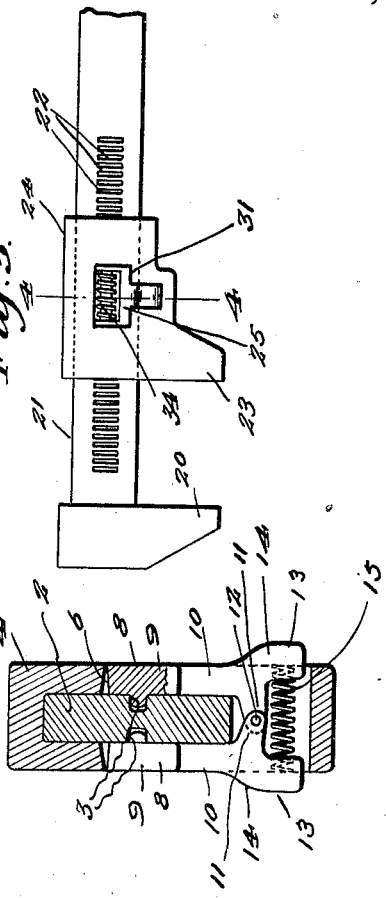
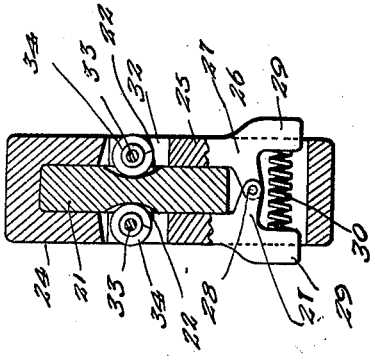
John C. Piechocki
E. K. Boinski
INVENTOR Patented Dec. 5, 1922.

1,437,774

UNITED STATES PATENT OFFICE.

JOHN C. PIECHOCKI AND EDMUND K. BOINSKI, OF BUFFALO, NEW YORK.

WRENCH.

Application filed June 11, 1921. Serial No. 476,893.

*To all whom it may concern:*

Be it known that we, JOHN C. PIECHOCKI and EDMUND K. BOINSKI, citizens of the United States, residing at Buffalo, in the county of Erie and State of New York, have invented new and useful Improvements in Wrenches, of which the following is a specification.

Our present invention has reference to improvements in monkey wrenches.

Our object is to produce a wrench of a simple construction, strong and durable, and wherein the movable jaw may be quickly adjusted with respect to the stationary jaw and with respect to the object to be engaged by the jaws.

Other objects and advantages will present themselves as the nature of the invention is better understood, reference being had to the drawings which accompany and which form part of this application.

In the drawings:—

Figure 1 is an elevation of a wrench constructed in accordance with this invention.

Figure 2 is a sectional view on the line 2—2 of Figure 1.

Figure 3 is a side elevation of a slight modification.

Figure 4 is a sectional view on an enlarged scale and on the line 4—4 of Figure 3.

Referring now to the drawings in detail, the numeral 1 designates the stationary jaw of our wrench, the same having a laterally extending shank 2. The shank, in the present instance, has its sides provided with a series of longitudinally arranged spaced apertures 3.

Arranged for movement on the shank 2 is a carriage 4 that has its end provided with a jaw 5. The jaw 5 is, of course, arranged next to the jaw 1. The carriage has a substantially T-shaped opening therethrough, the longitudinal branch 6 of which being disposed opposite the apertured sides of the shank 2, while the second branch 7 thereof extends beyond one of the edges of the shank 2. In the longitudinal branches of the T-shaped slots are the straight body portions 8 of dogs 9. The teeth of the dogs are designed to be received in certain of the apertures 3 of the shank 2. The body portions have angular extensions 10, each of which is provided with an ear 11, one ear overlying the other, and a pivot 12 passing through both ears, thus pivotally associating the respective dogs. One of the dogs is arranged on each side of the carriage 4, and the right angular portion 10 of each of the dogs has at its end a straight projection 13, the said projection having its outer portion rounded, as at 14 and projecting through the branch 7 of the angle slots. The portions 13 have arranged therebetween a pressure spring 15, the same exerting a tension against the said portions, swing the dogs on their pivots and swing the active or toothed surface 9 thereof into the apertures 6 of the shank 2. The rounded portions 14 of the handles permit of the operator exerting a pressure thereagainst to swing the dogs away from each other and thus release the movable jaw from the shank of the fixed jaw. Preferably, the ends of the springs 15 are received in depressions in the portions 13 of the dogs, and it is believed that the foregoing description, when taken in connection with the drawings will fully set forth the construction and advantages of the improvement.

The foregoing construction refers particularly to Figures 1 and 2 of the drawings. In Figures 3 and 4, the stationary jaw 20 has its shank 21 provided with spaced transverse depressions, forming therebetween teeth 22.

The movable jaw 23 has a carriage 24 which is slidable on the shank 21. The sides of the carriage 24 are provided with substantially T-shaped openings. In the shorter branch of these openings there are received the reduced portions 25 of dogs 26. The portions 25, on their inner faces have inwardly disposed ears 27 which are pivotally connected, as at 28, and the outer surface of the said portions 25 are enlarged to provide finger holds 29. Between these finger holds there is a helical spring 30 that forces the dogs in the openings or pockets provided therefor. The ends of the dogs, opposite that provided with the finger holds 29 are each formed with a lateral extension 31, that has its ends terminating in parallel arms 32, and between these pairs of arms there is a shaft 33 on which there is free mounted a screw wheel 34. The depressions between the teeth 21 are concaved, and the screw wheels 34 are snugly received in the said depressions and engage with the said teeth. By this construction a minute adjustment may be made after pressure is exerted upon the finger pieces 29 to swing the dogs on their pivot 28 to bring the worm wheels out of engagement with the teeth 22, so that the jaw 23 may be quickly moved in either direction on the shank 21 to engage an object between the said jaw and the jaw 20. Thereafter by merely turning the screws the jaw 23 will be brought further toward the jaw 20, and more effectively engage with an object between the said jaws.

Having described the invention, we claim:—

1. A wrench including a fixed jaw having an angle shank whose sides are provided with a line of longitudinally arranged spaced apertures, a carriage slidable on the shank and carrying a jaw, said shank having angle openings, the longitudinal branches of which communicating with the bore of the carriage and in a line with the apertured sides of the shank, and the second branch of the said opening being extended beyond one of the edges of the shank, dogs in the longitudinal branch of each of the openings and having teeth to engage with the apertures of the shank, said dogs having angle portions extending in the second branch of the opening and provided with inwardly directed lapping ears, a pivot member passing through the ears, angle handle portions formed on the ends of the dogs having outer rounded portions which project through the said branch of the opening, and a pressure spring between the last mentioned portions of the dogs.

2. A wrench including a stationary jaw having an angle shank whose sides are depressed to provide teeth between said depressions, a jaw having a movable carriage which is slidable on the shank, said carriage having its sides provided with T-shaped openings which communicate with its bore and the shorter passage of the opening forming a notch below the bore, dogs having reduced ends arranged in the shorter branch of the T-shaped openings, inwardly extending lugs on the dogs which are pivotally connected, springs between the said ends of the dogs for forcing the same in the openings, each dog having a lateral extension arranged in the wider branch of the T-shaped opening, and said extensions terminating in parallel flanges, a shaft secured between the flanges, and a screw free mounted on each shaft and normally in engagement with the teeth of the shank.

In testimony whereof we affix our signatures.

JOHN C. PIECHOCKI.
EDMUND K. BOINSKI.